(12) United States Patent
Brake

(10) Patent No.: US 6,646,557 B2
(45) Date of Patent: Nov. 11, 2003

(54) FISHING ROD HOLDERS WITH SIGNALING DEVICE

(76) Inventor: Bill G. Brake, 750 E. Rialto, Rialto, CA (US) 93276

(*) Notice: Subject to any disclaimer, the term of this patent is extended or adjusted under 35 U.S.C. 154(b) by 0 days.

(21) Appl. No.: 09/788,927

(22) Filed: Feb. 21, 2001

(65) Prior Publication Data
US 2002/0113710 A1 Aug. 22, 2002

(51) Int. Cl.[7] ............................................... G08B 23/00
(52) U.S. Cl. ..................... 340/573.2; 340/665; 340/668
(58) Field of Search ............................. 340/573, 573.2, 340/668, 665

(56) References Cited

U.S. PATENT DOCUMENTS

| | | | | |
|---|---|---|---|---|
| 3,618,068 A | * | 11/1971 | Sloan ........................... 340/283 |
| 3,835,568 A | * | 9/1974 | Whitfield ........................ 43/17 |
| 3,992,798 A | * | 11/1976 | Schmitt, Sr. .................... 43/17 |
| 4,154,015 A | * | 5/1979 | Holland ........................... 43/17 |
| 5,185,949 A | * | 2/1993 | Patterson ........................ 43/17 |

* cited by examiner

Primary Examiner—Jeffery Hofsass
Assistant Examiner—Hung Nguyen
(74) Attorney, Agent, or Firm—Dennis B. Haase

(57) ABSTRACT

A fishing pole holder in which a cradle is normally supported at an obtuse angle relative to a stable surface by a support member. A bite on the bait or lure at the end of a line from the pole results in a tug on the pole which releases the cradle, causing the cradle to engage the support member thereby actuating a signal to the fisherman that he or she has a bite on the line.

18 Claims, 3 Drawing Sheets

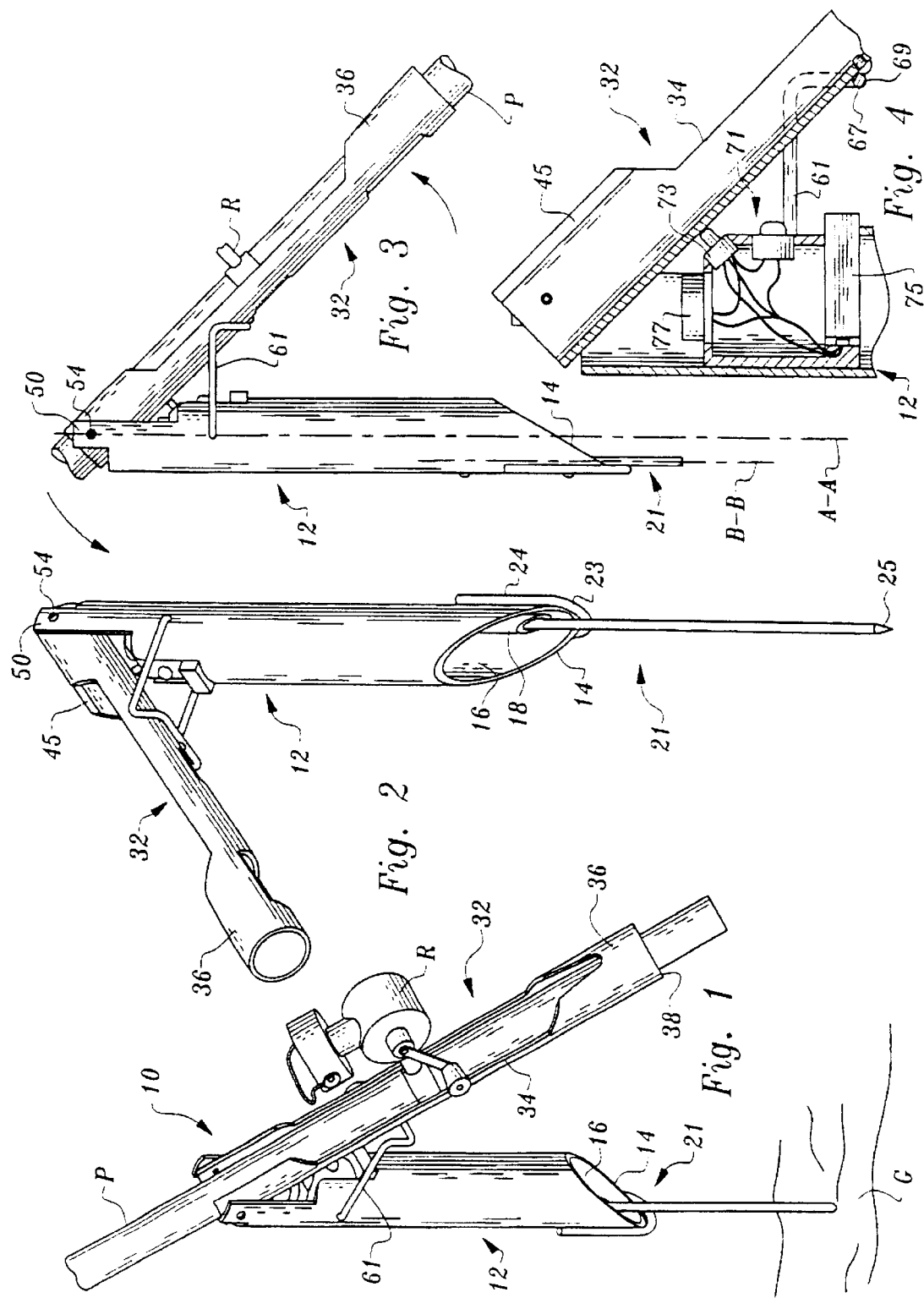

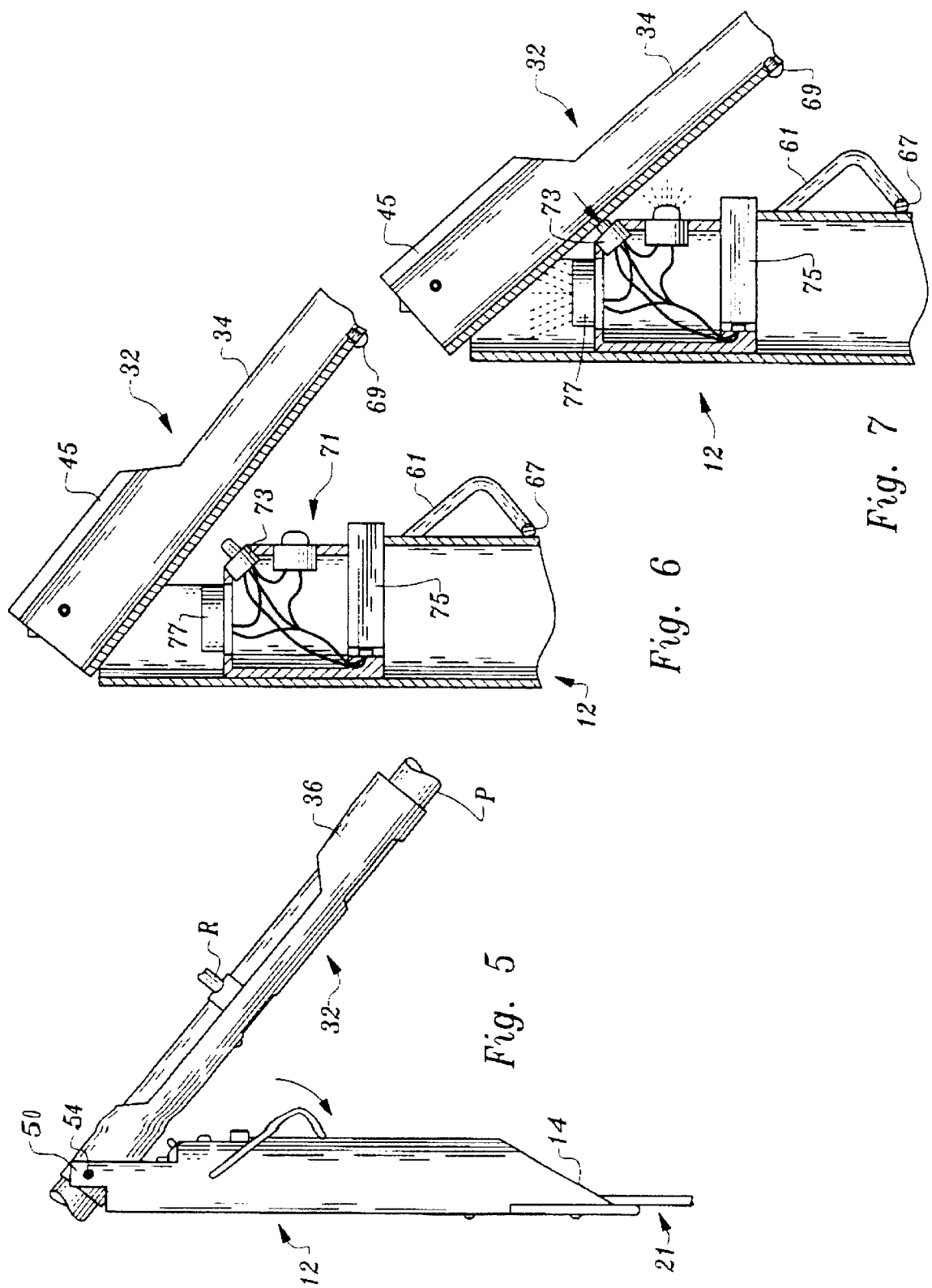

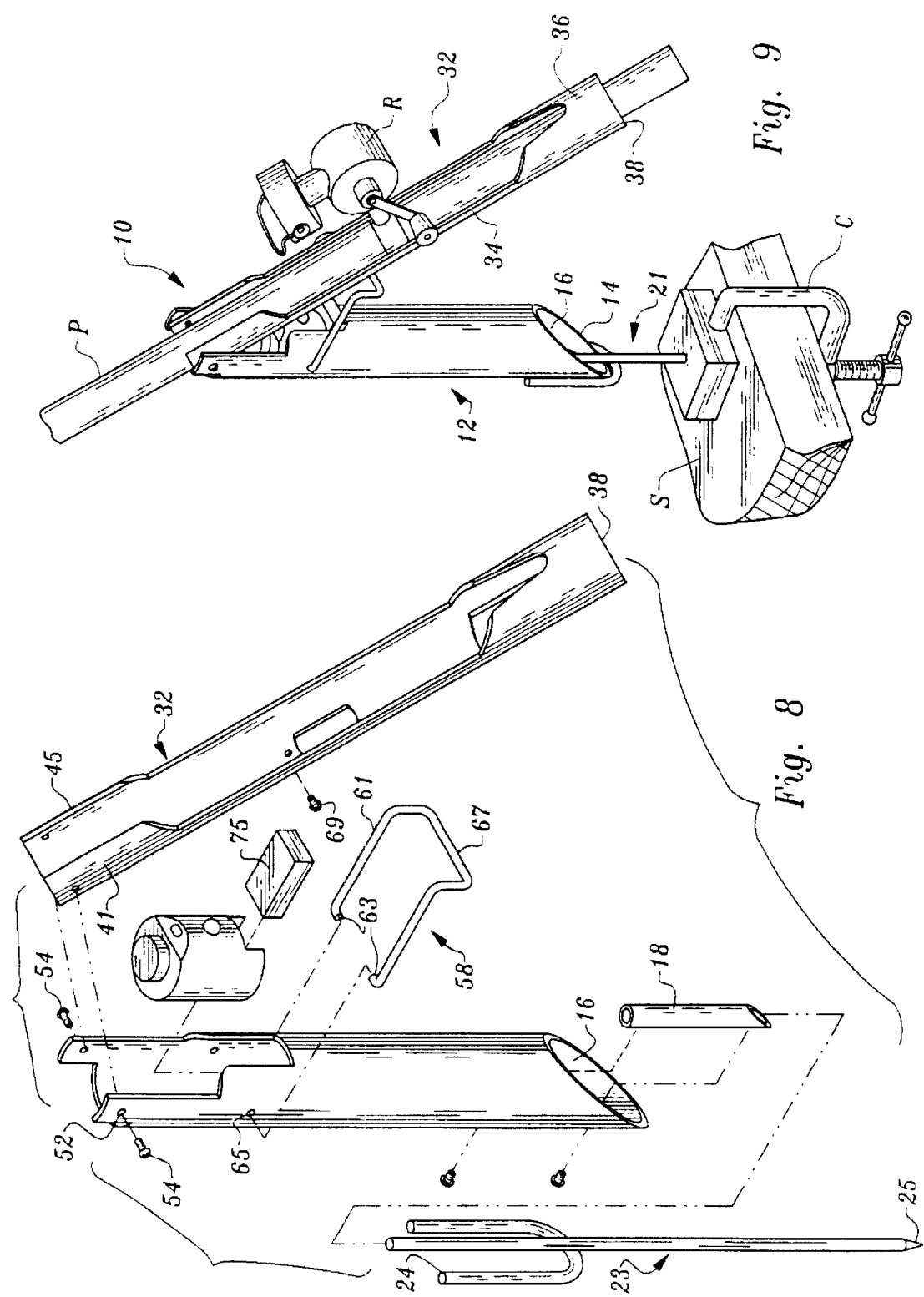

FISHING ROD HOLDERS WITH SIGNALING DEVICE

The present invention relates generally to fishing pole holders and, more particularly, to improvements in such holders which include an alarm, or signal, which is activated by the action of a fish striking the bait or lure.

BACKGROUND OF THE INVENTION

1. Field of the Invention

Fishing, or at least fishing with a rod or pole, except perhaps under the most frenetic competitive circumstances, is generally considered a relaxing activity. Indeed, it is sometimes so relaxing that the fisherman may even doze off, or even actually go to sleep.

Others engaged in this activity appreciate that, excepting commercial enterprise, a strike is not an instantaneous and continuous occurrence, and that if he or she does not have to constantly hold the pole or rod, there is time between bites to do other things, e.g., cook, read a book, or play a game with a friend.

In either circumstance, the fisherman wants to know if and when he or she has a strike, thus creating a need for 1) something to hold the pole or rod at the ready, and 2) some means of alerting the fisherman when there has been a strike at the bait or lure.

In recognition of the essential characteristics of the fisherman, the aforesaid problems have fostered several creative efforts to provide, to the fisherman, the tools with which to resolve the problem, as will be chronicled hereinafter.

2. Overview of the Prior Art

As may be seen from the following analysis, there have been a large number of patented efforts to provide the fisherman with the tools to permit him or her to engage in other activities, while being alerted to a strike as one occurs. These efforts differ primarily as to how the objectives may be accomplished, while being relatively uniform as to the means, i.e., all seem to use something to hold the rod or pole and something to alert the fisherman upon there being a strike at the bait or lure.

By way of example, Morgan U.S. Pat. No. 3,862,508 uses a pole holder pivotally disposed at the upper end of a support, and a coil spring biases the pole holder to normally position it transverse to the support. A strike on the line will overcome the bias of the spring, causing contact to be made with an alarm which, thus, alerts the fisherman.

In Braun U.S. Pat. No. 2,909,860, there is a leaf spring which supports a pole holder in an essentially upright attitude. In reality, the leaf spring supports the pole in its holder at an acute angle, and, when a strike occurs, the pole is biased in the direction of the arrow, counterclockwise, to hit the alarm button which actuates the alarm upon receiving a strike. Of some interest is the distance the pole must travel to engage the that distance being slight in Braun, relative to Morgan. Accordingly, it seems more likely that Braun would give a false signal than would Morgan.

The 1969 U.S. Pat. No. 3,058,251 to Brooks is a variation on the Braun theme in that the socket in which the end of the pole fits is spring biased and at an obtuse angle. The seeming primary difference in this one is that the spring is a coil spring as compared to the leaf spring of Braun.

The Smith U.S. Pat. No. 3,156,997, counts on essentially a vertical pole to actuate the alarm and, again, a coil spring is employed. A downward component of the force of the strike would actuate the alarm, which is situate beneath the butt of the handle of the pole.

In Wetsch U.S. Pat. No. 3,285,360, it is, again, a coil spring 33 which biases the pole holder toward the vertical. The alarm is at the side of the pole, and a horizontal component of the strike force is needed to bring the handle of the pole into actuating contact. In Schwartz et al. U.S. Pat. No. 3,359,672 there is, again, a coil spring but it is mounted along a bolt, apparently to limit movement, and, in Howard U.S. Pat. No. 3,628,275, the coil spring is mounted in yet another different, relative position.

Again, or similarly, as the case may be, Rayburn U.S. Pat. No. 3,645,028 uses a screw and spring arrangement to position the pole holder relative to the support, in essentially straight line alignment, although the support is positioned at an acute angle relative to the ground. Karr U.S. Pat. No. 4,217,720 and Hartwig U.S. Pat. No. 4,334,377 are variations on the same theme. Hutcherson U.S. Pat. No. 3,903,633 is a variation on the leaf concept, with the alarm on the handle. The alarm is actuated by coming into contact with an essentially stationary surface.

In each case, a signal is actuated as a direct result of a tug on the pole, presumably from a strike. As will be seen hereinafter, the present invention contemplates that a strike, or bite, will set in motion a chain of events which eventuates in the actuation of a signal.

SUMMARY OF THE INVENTION

The present invention comprises a novel fishing rod or pole holder, capable of positioning a fishing rod relative to the ground, or some stable object such as the gunwale or seat of a boat, or the like, and configured to cause a signal to be emitted upon the bait or lure being struck by a fish with sufficient force.

It is a principal object of the present invention to provide a holder of the type described which permits the user to do things other than holding the pole and waiting, while fishing, without fear or trepidation of losing a fish due to inattention.

Another object of the present invention is to provide a fishing pole holder which also audibly announces a viable strike at the bait or lure. A further objective related to the foregoing, is to provide such a fishing pole holder which emits an audible signal of sufficient volume, and sufficiently unpleasant to the human ear, as to defy being ignored, thus causing the user to immediately act to seek to abate the sound.

A still further objective of the present invention is to provide apparatus for initiating an audible signal which is relatively free of inadvertent actuation, thereby minimizing the likelihood of a false alarm.

Yet another objective of the present invention is to provide a holder of the type described, which can be assembled with ease and quickly disassembled for transportation in a minimal space.

The foregoing, as well as other objects and advantages of the present invention, will become apparent from a reading of the following Detailed Description of a Preferred Embodiment, taken in conjunction with the accompanying drawings, wherein:

DESCRIPTION OF THE DRAWINGS

FIG. 1 is a pictorial representation of the fishing rod holder of the present invention, as it would appear anchored in the earth, and with a typical fishing rod or pole mounted for use therein;

FIG. 2 is another view of the fishing rod holder of the present invention, shown in perspective, and illustrating, in greater detail, a portion of the signaling device;

FIG. 3 is a side elevation of the fishing rod holder of the present invention, with arrows indicating the direction of movement that would be experienced when a fish strikes the bait, not shown;

FIG. 4 is a portion of the fishing rod holder of FIG. 1, sectioned to illustrate certain details of the signaling device armed, but prior to actuation;

FIG. 5 is a view of the fishing rod holder of the present invention similar to that of FIG. 3, but with the supporting bracket having dropped so as to permit the cradle to swing into contact with the signal;

FIG. 6 is a view similar to FIG. 4, but with the supporting bracket dropped out of contact with the cradle;

FIG. 7 is a view similar to that of FIG. 5, with the cradle now in contact with the signal to actuate the same;

FIG. 8 is an exploded view of the fishing pole holder of the present invention illustrating the relative position and orientation of the various parts; and FIG. 9 illustrates an alternative to anchoring the fishing pole holder in the ground, showing the manner in which it can be clamped, e.g., to the gunwale or seat of a boat.

DETAILED DESCRIPTION OF A PREFERRED EMBODIMENT

With reference now to the drawings, and initially to FIG. 1, a fishing pole holder 10 is provided in accordance with the present invention. For purposes of this discussion, the term "pole" and "rod" are understood to be synonymous and interchangeable.

The holder 10 of the present invention comprises, in keeping with the objectives of the invention, a support member such as post 12, which in the illustrated configuration, is tubular.

At its lower end 14, the support member 12 is beveled and disposed on the interior surface or wall 16 thereof is a cylindrical receiver 18, which is secured, in any well known fashion, to the interior wall 16 and is so oriented that the longitudinal axis A—A is coplaner with the longitudinal axis B—B of the support member 12.

In order, in keeping with other objectives of the present invention, to permit the post 12 to be secured relative to the ground G, or to some stable object such as the seat or gunwales S of a boat, the pole holder of the present invention is provided with an anchor 21. The anchor 21, as illustrated in FIGS. 1, 2 and 8, comprises a spike 23, having a pointed end 25, capable of being secured to a stable surface as in the ground to thereby anchor and support the post 12.

In order that the anchor may be removably received in the post 12, with the post repeatably disposed at a fixed distance from the ground, the anchor is equipped with a collar 27, which is permanently attached to the upper portion of the anchor, remote from the pointed end 25, in any suitable fashion. The diameter of the spike is such that it is snugly received in the receiver 18, and the collar engages the receiver to limit movement of the anchor therein such that the pointed end of the anchor extends beyond the beveled end 14 of the post by a predetermined amount. The entire device is stabilized on the anchor by parallel upstanding legs 24 which flank the receiver to prevent inadvertent lateral movement of the post which could occur as a result of a substantial strike on the hook.

It is within the contemplation of the invention that the anchor, as an alternative to the spike end 25, be provided with a clamp, or clevis, C which would permit the anchor to be secured to stable objects such as the seat or gunwale of a boat, thereby adding versatility to the pole holder of the present invention.

In order that the pole or rod, P, having a reel R upon which the fishing line is wound, but not expressly shown, may be securely held, a pole cradle 32 is provided. The cradle is preferably formed from a tubular member, an upper portion of which is cut away along upper wall or edge 34. It will be clearly understood, however, that several different ways of forming the cradle may be employed without departure from the invention.

Whatever method is employed, a strap 36 is formed, or otherwise results at or near the remote end 38 of the cradle in order that a portion of the handle of the pole will be completely encircled by the cradle, to thereby inhibit its being pulled upwardly and out of the cradle by a particularly vicious strike.

As a convenience to the user, a forward strap 41, forward referring to its position at the end 43, opposite the end 38, is also provided to substantially, although not entirely, encircle the pole. The forward strap is slotted at 45 in order to facilitate the mounting of the pole in the cradle. In light of the fact that the tug on the pole, properly disposed in the cradle, will be downwardly, the slot will not permit the pole to be inadvertently pulled from the cradle through the slot. The rear strap will, as stated, aid in inhibiting such action.

It is important to the proper operation of the holder 10 of the present invention that the cradle 32 be mounted to the support member 14 for limited relative rocking movement thereabout. In keeping with this aspect of the invention, the upper end of the support member 12 is formed, or otherwise provided, with ears 50, each of which projects upwardly along the axis B—B thereof. Each of the ears is pierced, as at apertures 52, to receive a suitable fastener 54. The apertures 52 are axially aligned along a line which is transverse to the axis of the support member 12. There are corresponding apertures in the cradle 32, in order that the fasteners 54, and upon assembly, the cradle 32, is capable of limited rotation about the fasteners on the axis thereof.

It is a feature of the present invention that inadvertent actuation of the signal is minimized, and that when the signal is actuated it is the result of a strike on the line and not some other phenomenon. In accomplishing this objective, it is intended that the signal not be actuated directly by a tug or pull of the fishing pole directly into contact with the signal. Rather, a short and rapid chain of events is set in motion which culminates in a signal being emitted.

To this end, the cradle 32, with pole in place and line in the water, is supported against rotation in one direction, as seen in FIGS. 1 and 3, in the clockwise direction by a bracket 58. The bracket 58, as shown, comprises a wire 61, having tabs 63 which are loosely fitted in holes 65 drilled or otherwise formed in the post 12. The wire 61 is shaped along its center portion 67 to receive the cradle 32 forward of the pivot axis defined by the fasteners 54. By virtue of the loose mounting of the bracket, it is free to rotate in the holes 65 relative to post 12. The bracket is preferable to springs which are susceptible to damage and even changes in spring rate, which can adversely effect operation of the device.

In order, in keeping with the objectives of the invention, and to inhibit the bracket from unintended or accidental rotation, the underside of the cradle is formed, or otherwise fitted, with a nib 69. The center section 67 of the bracket 58 engages the nib 67 when the holder is in use, thus limiting movement of the cradle 32 in the clockwise direction relative thereto.

In operation, however, when there is a strike on the bait or lure of sufficient force as to clearly indicate that a fish has at least attempted to take the bait, the cradle is caused, by pressure on the handle of the fishing pole, to move in a counterclockwise motion. A slight movement will cause the center portion of the bracket to move off the nib 69. As a result, the bracket will drop, by force of gravity, out of the path of the nib 69, and the weight of the rod and cradle will cause the cradle to rotate in a clockwise direction into abutting relation with the support member 12. Coincidently, this movement will have a tendency to set the hook as a result of the upward movement of the pole and, thus, the line and bait attached thereto. The term bait and lure will be understood and regarded as interchangeable as used herein.

In order to provide an audible signal, which is a feature of the invention, a signal device 71 is provided, and as illustrated, is conveniently secured relative to the support member, such as by mounting the same in the side wall of the support member in the path of rotation of the cradle 32. It will be appreciated, however, that the signal 71 could easily be mounted relative to the cradle by securing it in or on the cradle without departure from the invention.

The signal device 71, which is susceptible of being encapsulated and fitted into the support member 12, or cradle 32, comprises, in the exemplary case, a micro switch 73, of known construction, which is wired to a battery 75 and to an audible buzzer 77, or similar known device. The buzzer 77 preferably emits a signal which is of such tone as to be irritating to the human ear, thus encouraging prompt action by those nearby to take steps to disable the signal and put a stop to the noise.

Having thus described a preferred embodiment of my invention, and with the understanding that some variation in the specific apparatus described as exemplary is within the contemplation of the invention, what is claimed is:

What is claimed is:

1. A device for holding a fishing pole wherein the pole includes a line at the end of which is either bait or lure, and emitting a signal in response to a fish striking the bait or lure, comprising, in combination:

a support member; said support member adapted to be anchored to a stable surface at one end thereof;

a cradle, said cradle adapted to support the fishing pole, and being rotatably secured to said support member for limited rocking movement relative thereto, said support member having a nib disposed thereon;

a bracket, said bracket being mounted for rotational movement to said support member, and normally engaging said nib on said cradle;

said cradle being rocked in a forward arc by a strike on the bait, said rocking motion causing said nib to drop away from said bracket, whereby said cradle rocks in the opposite direction into contact with said support member;

a signal device, said signal device being disposed between said cradle and said support member, and being actuated by contact between said cradle and said support member to signal a bite on the line.

2. The device for holding a fishing pole of claim 1, wherein said signal device is carried on said support member.

3. The device for holding a fishing pole of claim 1, wherein said signal device is secured relative to said cradle.

4. The device for holding a fishing pole of claim 1, wherein said cradle is equipped with straps thereon to hold the fishing pole thereon.

5. The device for holding a fishing pole of claim 1, wherein an anchor is provided, said anchor being removably affixed in said support member to position said fishing rod holder relative to a stable surface.

6. The device for holding a fishing pole of claim 1, wherein said support member includes a receiver, said receiver being fixed relative to said support member; a collar, said collar affixed to said anchor, and sized so as to engage said receiver to establish the position of the fishing pole relative to said stable surface.

7. The device for holding a fishing pole of claim 5, wherein said anchor includes a clamp at an end thereof, said clamp adapted to engage an edge of a stable surface.

8. The device for holding a fishing pole of claim 5, wherein said anchor includes a spike, said spike adapted to penetrate the stable surface to hold said fishing pole holder in place.

9. The device for holding a fishing pole of claim 1, wherein said device has opposed ears, said ears disposed on said support member, and adapted to circumscribe said cradle, fasteners disposed in said ears, said fasteners penetrating said cradle to permit pivotal movement thereof relative to said support member.

10. The device for holding a fishing pole of claim 1, wherein said signal device is encapsulated for securing to a portion of the fishing pole holder as a unit.

11. The device for holding a fishing pole of claim 1, wherein said signal device comprises a micro switch, a battery, and a signal, said micro switch being wired to said battery to selectively make an electrical connection between said signal and said micro switch when said micro switch is activated.

12. The device for holding a fishing pole of claim 2, wherein said signal device is encapsulated for securing to a portion of the fishing pole holder as a unit.

13. The device for holding a fishing pole of claim 3, wherein said signal device is encapsulated for securing to a portion of the fishing pole holder as a unit.

14. The device for holding a fishing pole of claim 6, wherein said signal device is encapsulated for securing to a portion of the fishing pole holder as a unit.

15. A device for holding a fishing pole wherein the pole includes a line at the end of which is either bait or lure, and emitting a signal in response to a fish striking the bait or lure, comprising, in combination:

a support member, said support member including a removable anchor;

a cradle, said cradle being attached to said support member for limited rotation relative thereto;

a bracket, said bracket being mounted to said support member and being movable into and out of engagement with said cradle;

a nib on said cradle, said nib being positioned to engage said bracket when said bracket is engaged with said cradle to thereby support said cradle against movement of said cradle towards said support member;

said bracket adapted to rotate away from said cradle when said cradle is moved by a strike on the bait, said cradle rotating into engagement with said support member when said bracket is dropped;

a signal, said signal being disposed between said cradle and said support member, and so positioned that movement of said cradle into engagement with said support member actuates said signal to thereby audibly announce that the bait had been struck.

16. The device for holding a fishing pole of claim 15, wherein said device has opposed ears, said ears disposed on said support member and adapted to circumscribe said cradle, fasteners disposed in said ears, said fasteners penetrating said cradle to permit pivotal movement thereof relative to said support member.

17. The device for holding a fishing pole of claim 15, wherein said signal device is encapsulated for securing to a portion of the fishing pole holder as a unit.

18. The device for holding a fishing pole of claim 15, wherein said signal device comprises a micro switch, a battery, and a signal, said micro switch being wired to said battery to selectively make an electrical connection between said signal and said micro switch, when said micro switch is activated.

* * * * *